(Model.)
T. HALEY.
HOSE OR PIPE COUPLING.
No. 382,468. Patented May 8, 1888.
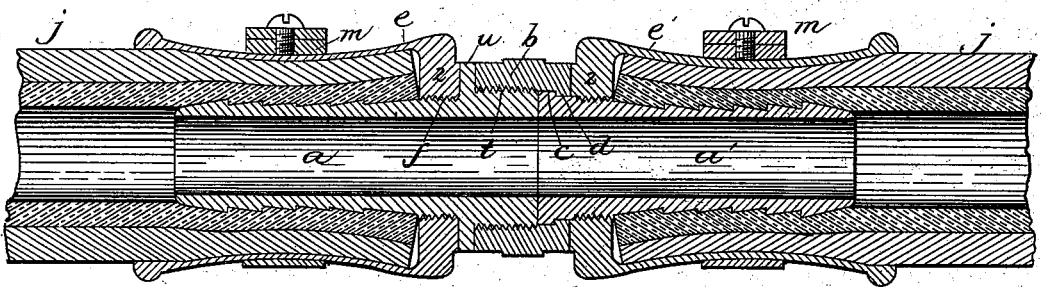
Fig-1-
Fig-2-
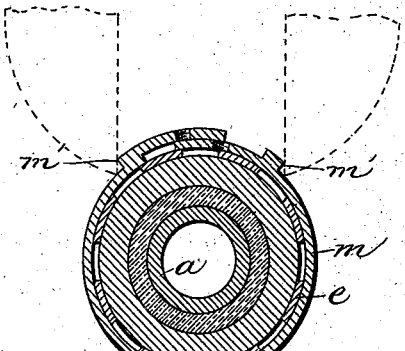
Fig-3-
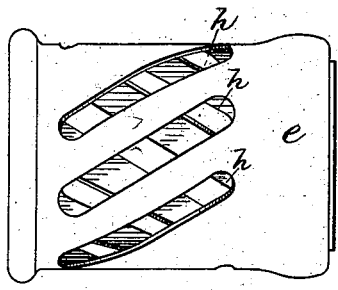
Fig-4-
WITNESSES
J. T. Ball.
C. P. Craker.
INVENTOR
Thomas Haley
by Wright, Brown & Quinby
Attys.

UNITED STATES PATENT OFFICE.

THOMAS HALEY, OF BOSTON, MASSACHUSETTS.

HOSE OR PIPE COUPLING.

SPECIFICATION forming part of Letters Patent No. 382,468, dated May 8, 1888.

Application filed September 21, 1887. Serial No. 250,281. (Model.)

*To all whom it may concern:*

Be it known that I, THOMAS HALEY, of Boston, in the county of Suffolk and State of Massachusetts, have invented certain new and useful Improvements in Hose or Pipe Couplings, of which the following is a specification.

This invention relates to couplings for connecting lengths of hose or other flexible or compressible pipe; and it consists in the combination, with a tail-piece adapted to be inserted in the end of a section of hose or pipe and a clamp adapted to be compressed around said hose or pipe to bind it tightly upon said nipple, of a binder consisting of a compressible socket attached to the tail-piece and formed to inclose the end of the hose or pipe upon said tail piece, and slotted so that it will be compressed by the clamp, the latter being applied to the outer surface of the binder.

The invention also consists in certain details of construction, all of which I will now proceed to describe and claim.

Of the accompanying drawings, forming a part of this specification, Figure 1 represents a longitudinal section of a coupling embodying my invention. Fig. 2 represents a section on line $x$ $x$, Fig. 1. Fig. 3 represents a section on the plane of line $x$ $x$, Fig. 1, before the clamp, socket, and hose or pipe are compressed. Fig. 4 represents a side view of the compressible binder before compression.

The same letters of reference indicate the same parts in all the figures.

In the drawings, $a$ represents a tail-piece, preferably having its exterior suitably corrugated to enable it to hold a hose or pipe placed upon it. Said tail-piece is connected by a coupling-nut, $b$, with a similar tail-piece, $a'$, the tail-piece $a$ having an external screw-thread, $t$, at its rear end to engage the internal thread of said nut, while the tail-piece $a'$ has an outwardly-projecting flange, $c$, to engage an inwardly-projecting flange, $d$, on the nut.

$e$ $e'$ represent cylindrical metallic sockets, which I term "binders," each of which has a head, 2, provided with a screw-threaded orifice at one end, and is open at its opposite end. The orifices in said heads are formed to engage with external screw-threads, $f$ $f'$, formed, respectively, on the tail-pieces $a$ $a'$, as shown in Fig. 1. Each binder is provided with slots, which extend from points near its open end part way to its rear end, as shown in Fig. 4, and are preferably arranged obliquely or spirally. The spiral arrangement is highly advantageous, because it gives the divisions of the binder between the slots a longer bearing on the hose or pipe, and enables them the better to resist longitudinal strain tending to pull the hose or pipe out from the binder. Said slots weaken the bodies of the binders, so that they can be contracted or compressed, as hereinafter described. The binders, when secured to the tail-piece, inclose the latter, as shown in Fig. 1, and are considerably larger that the tail-piece, so that annular spaces exist between the tail-pieces and the inner surfaces of the binders of sufficient size to receive the ends of the lengths, $j$ $j$, of hose or pipe to be connected by the device.

In connecting the lengths $j$ $j$ the binders $e$ $e'$ are screwed onto the tail-pieces before the binders are contracted and while they are in the condition represented in Fig. 4. The ends of the hose or pipe lengths $j$ $j$ are then placed on the tail-pieces and within the binders, after which clamps $m$ $m$, constructed as shown in Figs. 2 and 3, are placed upon the binders and compressed by vise-jaws or other suitable devices applied to the shoulders $m'$ $m'$ of the clamps, as shown in Fig. 3. The pressure of the jaws causes the ends of the clamps to overlap more and more, decreasing the diameter of the clamps and contracting the binders, the slotted portions of which yield to the pressure and press the portions of the hose or pipe lengths within them closely against the corrugated tail-pieces. When the clamps and binders are sufficiently compressed, the clamps are secured by screws $n'$, inserted in coinciding orifices in their overlapping ends.

I am aware that the ends of hose or pipe lengths have been secured upon tail-pieces placed within them by devices like the clamps $m$, herein shown, said clamps bearing directly on the lengths of hose or pipe. It will be seen, however, that the slotted binders secured to the tail-pieces and interposed between the clamps and the hose or pipe lengths distribute the pressure of the clamps over a greater extent of said lengths, protect the ends of the lengths, and aid materially in preventing them from being pulled off from the tail-pieces.

The two tail-pieces, detachably connected, as shown in Fig. 1, and the duplicate clamps and slotted binders accompanying the same, constitute a convenient and practical means for connecting two lengths of hose or pipe; but it is obvious that a single tail-piece and clamp will embody the spirit of my invention.

The tail-piece $a$ (shown in Fig. 1) has a flange, $u$, against which the head of the binder $e$ and the nut $b$ abut, said flange forming a stop for said binder and nut.

I prefer to make the tail-pieces somewhat larger at their outer ends, and to arrange the clamps so that they will compress the binders and pipes about midway of the length of the tail-pieces.

This improved device may be used to secure elastic hose or pipes of lead or other compressible metal.

I claim—

1. In a hose-coupling, the combination, with a tail-piece, of a binder consisting of the end portions, and the slotted intermediate portion secured at one end to the tail-piece and projecting over the latter, and a clamping-ring adapted to encircle and compress the binder at the slotted portion, clamping the hose between the binder and tail-piece, substantially as described.

2. The improved coupling composed of the tail-pieces connected as described, the binders having the slots closed at both ends, and the internally-threaded heads screwed upon and inclosing said tail-pieces, and the clamping-rings supported upon the binder, adapted to compress the slotted portion thereof and clamp the hose between it and the binder.

3. The combination, with a tail-piece adapted to be inserted in a hose or pipe and enlarged at its outer end, of a slotted compressible binder having an internally-threaded head screwed upon said tail-piece and adapted to receive the end of the hose in which the tail-piece is inserted, and a clamping-ring unconnected with the tail-piece, but supported entirely upon the binder-back of its point of connection with the tail-piece, arranged to compress it and clamp the hose between said binder and tail-piece, substantially as described.

4. The combination of the tail-piece $a$, having the flange $u$, and screw-threaded at both sides of said flange, the slotted binder and flanged nut $b$, adapted to be screwed upon the tail-piece and to bear the one against one side and the other against the opposite side of the flange $u$, the flanged tail-piece $a'$, engaged with said nut and threaded at $f'$, and the slotted binder $e'$, screwed upon the tail-piece $a'$, all arranged and operating substantially as described.

5. The combination, with an internal support for the hose, of a metallic binder composed of a cylinder having spirally-arranged slots in its body closed at the ends, and an independent clamping-ring adapted to be applied to the slotted portion of the binder and clamping the hose between the binder and internal support, substantially as described.

6. The combination, with the tail-piece, of the outer slotted sleeve or binder secured thereto, and a clamping-ring unconnected with the tail-piece applied to the slotted portion of the binder back of its connection with the tail-piece for clamping it to the hose and being itself held in place entirely upon said binder, substantially as described.

In testimony whereof I have signed my name to this specification, in the presence of two subscribing witnesses, this 17th day of September, A. D. 1887.

THOMAS HALEY.

Witnesses:
C. F. BROWN,
A. D. HARRISON.